(12) United States Patent
Yeping

(10) Patent No.: US 10,954,415 B2
(45) Date of Patent: Mar. 23, 2021

(54) AQUEOUS NOCTILUCENT AND ALLOCHROIC GLUE

(71) Applicant: ZHEJIANG KAIDA STATIONERY CO., LTD., Zhejiang (CN)

(72) Inventor: Li Yeping, Hangzhou (CN)

( * ) Notice: Subject to any disclaimer, the term of this patent is extended or adjusted under 35 U.S.C. 154(b) by 0 days.

(21) Appl. No.: 16/398,899

(22) Filed: Apr. 30, 2019

(65) Prior Publication Data

US 2020/0347274 A1 Nov. 5, 2020

(51) Int. Cl.
| | |
|---|---|
| *C09J 129/04* | (2006.01) |
| *C09J 9/00* | (2006.01) |
| *C09J 11/04* | (2006.01) |
| *C09J 131/04* | (2006.01) |
| *C09K 11/02* | (2006.01) |
| *C09J 139/06* | (2006.01) |
| *C08K 5/098* | (2006.01) |
| *C08K 3/38* | (2006.01) |
| *C08K 5/053* | (2006.01) |

(52) U.S. Cl.
CPC .............. *C09J 9/00* (2013.01); *C09J 11/04* (2013.01); *C09J 129/04* (2013.01); *C09J 131/04* (2013.01); *C09J 139/06* (2013.01); *C09K 11/02* (2013.01); *C08K 3/38* (2013.01); *C08K 5/053* (2013.01); *C08K 5/098* (2013.01); *C08K 2003/387* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,405,366 A | * | 4/1995 | Fox ...................... | A61K 9/0014 424/443 |
| 7,879,942 B2 | * | 2/2011 | O'Brien ................. | A61L 15/58 524/500 |
| 2006/0246149 A1 | * | 11/2006 | Buchholz ................. | A61P 1/02 424/603 |
| 2015/0037393 A1 | * | 2/2015 | Millman ............... | A61K 8/0208 424/448 |

* cited by examiner

*Primary Examiner* — Monique R Peets
(74) *Attorney, Agent, or Firm* — Frost Brown Todd LLC

(57) ABSTRACT

An aqueous noctilucent and allochroic glue that includes deionized water; a noctilucent material that includes long-afterglow phosphor powder and a transparent medium, wherein the noctilucent material includes particles formed by creating, curing, and then crushing a suspension, mixture, or sheet of the long-afterglow phosphor powder and transparent medium, and wherein the particles have been coated with allochroic material; adhesive; and suspension concentrate.

10 Claims, 1 Drawing Sheet

AQUEOUS NOCTILUCENT AND ALLOCHROIC GLUE

BACKGROUND OF THE INVENTION

The described invention relates in general to color-changing and glow-in-the dark compositions, and more specifically to various aqueous allochroic (color-changing) and noctilucent (glow-in-the dark) glues and adhesive formulations having thermochromic or optically variable properties, and processes and methods for making the same.

Most commercially available glow-in-the dark adhesives or glues are formulated with noctilucent materials that include long-afterglow phosphor powder. Because such long-afterglow phosphor powders typically include small particles and exhibit low luminance, to obtain a higher luminance, the concentration of the noctilucent powder in the formulation must be increased. However, increasing the concentration of the noctilucent powder in a formulation may result in a significant increase in cost and at extremely high concentrations, light generated by luminescent particles may be dispersed during the transmission thereof, thereby negatively affecting the overall luminance of the formulation and/or product.

Through recent advancements in materials science, various thermochromic and photochromic glues have become commercially available. The appearance and color of these glues can be changed by varying the temperatures or lighting conditions under which the glues are used. However, because such glues do not actively luminesce, these materials cannot be used under non-luminous conditions and are typically only useful in luminous environments such as daytime or daylight. Consequently, the scope of use and the applications of such materials have been limited. Accordingly, there is an ongoing need for thermochromic and photochromic glues that also have noctilucent properties based on improved luminescence.

SUMMARY OF THE INVENTION

The following provides a summary of certain exemplary embodiments of the present invention. This summary is not an extensive overview and is not intended to identify key or critical aspects or elements of the present invention or to delineate its scope. However, it is to be understood that the use of indefinite articles in the language used to describe and claim the present invention is not intended in any way to limit the described system. Rather the use of "a" or "an" should be interpreted to mean "at least one" or "one or more".

In accordance with one aspect of the present invention, a first aqueous noctilucent and (optionally) allochroic glue is provided. This glue includes deionized water, wherein the mass percent of the deionized water is in the range of 65%-85%; noctilucent material, wherein the mass percent of the noctilucent material is in the range of 1%-25%, and wherein the noctilucent material includes long-afterglow phosphor powder, wherein the long-after glow phosphor powder is 1%-70% of the noctilucent material; and a transparent medium, wherein the transparent medium is 30%-99% of the noctilucent material; and wherein the noctilucent material includes particles formed by creating, curing, and then crushing a suspension, mixture, or sheet of the long-afterglow phosphor powder and transparent medium, and wherein, optionally, the particles have been coated with allochroic material; adhesive, wherein the mass percent of the adhesive is in the range of 15%-20%; and suspension concentrate, wherein the mass percent of the suspension concentrate is in the range of 0.6%-1.2%.

In accordance with another aspect of the present invention, a second aqueous noctilucent and allochroic glue is provided. This glue includes deionized water, wherein the mass percent of the deionized water is in the range of 65%-85%; noctilucent material, wherein the mass percent of the noctilucent material is in the range of 1%-25%, and wherein the noctilucent material includes long-afterglow phosphor powder, wherein the long-after glow phosphor powder is 1%-70% of the noctilucent material; and a transparent medium, wherein the transparent medium is 30%-99% of the noctilucent material; and wherein the noctilucent material includes particles formed by creating, curing, and then crushing a suspension, mixture, or sheet of the long-afterglow phosphor powder and transparent medium, and wherein the particles have been coated with allochroic material; adhesive, wherein the mass percent of the adhesive is in the range of 15%-20%; and suspension concentrate, wherein the mass percent of the suspension concentrate is in the range of 0.6%-1.2%.

In yet another aspect of this invention, a third aqueous noctilucent and allochroic glue is provided. This glue includes deionized water, wherein the mass percent of the deionized water is in the range of 65%-85%; noctilucent material, wherein the mass percent of the noctilucent material is in the range of 1%-25%; adhesive, wherein the mass percent of the adhesive is in the range of 15%-20%; moisturizer, wherein the mass percent of the moisturizer is in the range of 2%-5%; suspension concentrate, wherein the mass percent of the thickening agent is in the range of 0.6%-1.2%; disinfectant, wherein the mass percent of the disinfectant is in the range of 0.2%-0.3%; pigment, wherein the mass percent of the pigment is in the range of 0.4%-0.8%; defoamer, wherein the mass percent of the defoamer is in the range of 0.1%-0.2%; dispersant, wherein the mass percent of the dispersant is in the range of 0.4%-0.5%; plasticizer, wherein the mass percent of the plasticizer is in the range of 0.1%; flash powder, wherein the mass percent of the flash powder is in the range of 0-10%; color-changing powder, wherein the mass percent of the color-changing powder is in the range of 0-10%; and, optionally, sodium tetraborate, wherein the mass percent of the sodium tetraborate is in the range of 0-0.6%.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein.

DETAILED DESCRIPTION OF THE INVENTION

Figure 1:
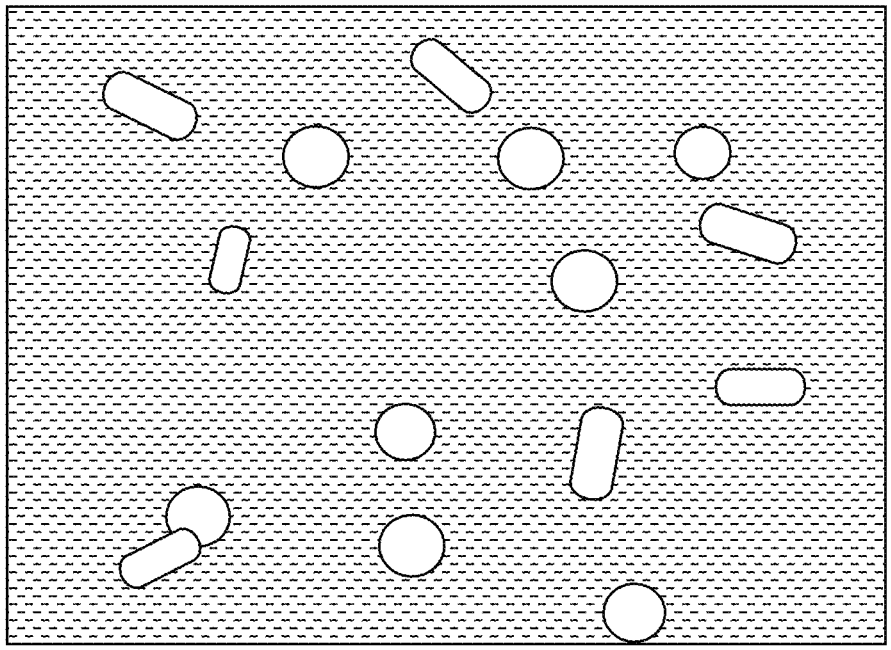
FIG. 1 is a graphic representation of a noctilucent suspension in accordance with a first exemplary embodiment of the present invention.

Exemplary embodiments of the present invention are now described with reference to the Figures. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

In the broadest sense, this invention provides multifunctional aqueous allochroic (color-changing) glues that also includes noctilucent (glow-in-the-dark) properties. Methods for making these glues are also provided. In one method, long-afterglow phosphor powder is mixed with transparent resin to obtain a particulate noctilucent suspension through injection molding or extrusion and then crushing. Alternately, a mixture of long-afterglow phosphor powder and transparent resin may be spread on the surface of sheet material to obtain a tabular noctilucent suspension through crushing. Additionally, the noctilucent suspension particles of this invention may be immersed into and coated by a mixture of allochroic powder (commercially available) and transparent resin. General process steps include continuous high-speed cutting and dispersion of the suspension in deionized water at 10° C.-30° C. to obtain a system of high suspension power in the form of curry a slurry. The temperature is then increased to 80° C.-90° C., and glue is added for continuous dispersion to obtain a solid reticular system in the form of a colloidal dispersion. This system provides a large superficial area, high adsorption power, and strong suspension dynamics, which allows the relatively heavy noctilucent suspension to float after absorption. Water-soluble pigments may be added, as desired.

The various formulations of the present invention provide materials having thermochromic, photochromic, and long-afterglow luminescent properties, thereby allowing these materials to be used in non-luminous environments. These inventive materials are water-soluble, making clean-up of the same relatively easy. These materials may be used for coloring and painting on paper, glass, and ceramic even if the surfaces of these substrates are free of roughness or other texture. The relatively high viscosity of these materials also makes them suitable for use as conventional liquid glues for adhesion of paper and wood. Borax and boric acid solutions may be used to change the various formulations of the present invention into multi-color gelatinous slime having allochroic and noctilucent properties.

A generic embodiment of the present invention provides an aqueous multifunctional noctilucent (glow-in-the dark) liquid glue that includes the following ingredients and/or components: (i) deionized water having a mass percent of 65%-85%; (ii) noctilucent suspension having a mass percent of 1%-25%; (iii) adhesive (glue) having a mass percent of 15%-20%; (iv) moisturize having a mass percent of 2%-5%; (v) suspension concentrate (e.g., thickening agent) having a mass percent of 0.6%-1.2%; (vi) disinfectant having a mass percent of 0.2%-0.3%; (vii) pigment having a mass percent of 0.4%-0.8%; (viii) defoamer having a mass percent of 0.1%-0.2%; (ix) dispersant having a mass percent of 0.4%-0.5%; (x) plasticizer having a mass percent of 0.1%; (xi) flash powder having a mass percent of 0-10%; (xii) color changing powder having a mass percent of 0-10%; and (xiii) Borax (sodium tetraborate) having a mass percent of 0-0.6%. The noctilucent suspension includes 10%-70% long-afterglow phosphor powder (commercially available) and 30%-90% transparent medium. The long-afterglow phosphor powder and transparent medium may comprise a solution, tabular mixture, or particulate suspension. The long-afterglow phosphor powder and transparent medium may be processed using heated or reacted curing, injection molding, extrusion, or shaping, and then breaking or crushing (in a liquified or melted state) to obtain 1 mm-15 mm noctilucent particles. Alternately, the long-afterglow phosphor powder and transparent medium suspension (in a liquified or melted state) may be coated on the surface of a sheet of material to obtain 1 mm-15 mm noctilucent particles through heated or reacted curing, shaping, breaking or crushing of the sheet.

In various embodiments of this invention, the external surfaces of the noctilucent suspension particles are coated or otherwise covered with an allochroic photic layer. The allochroic photic layer may be a mixture that includes 10%-30% allochroic powder and 70%-90% transparent medium and may be formed through heated or reacted curing of liquefied or melted allochroic powder and transparent medium into which the noctilucent particles have been immersed. Alternately, the external surface of the noctilucent suspension sheet may be covered with an allochroic transparent layer. The allochroic transparent layer may be a mixture that includes 10%-30% allochroic powder and 70%-90% transparent medium and may be formed through heated or reacted curing of liquefied or melted allochroic powder and transparent medium coated on the external surface of the noctilucent suspension sheet. In certain embodiments of this invention, the color of the said thermochromic layer is lighted at the temperature below the critical value as compared with that at the temperature above the critical value. In certain embodiments of this invention, the photochromic layer is achromatic and transparent when it is not actuated and a dark color when actuated.

In various alternate or optimized embodiments of this invention, the adhesive or glue component may include polyvinyl alcohol, polyvinyl acetate emulsion, polyvinylpyrrolidone, acrylic emulsion, or any combination thereof. The moisturizer component may include polyethylene glycol, propylene glycol, glycerol, sorbitol, or any combination thereof. The suspension concentrate component may include xanthan gum, carbo resin, guar gum, sodium carboxymethyl cellulose, or any combination thereof. The plasticizer component may include sodium benzoate 990 and/or 998 of medium and high solubility. The transparent medium may include polyethylene, polypropylene, polymethyl methacrylate, polycarbonate, polyvinyl chloride, polyamide, polyethylene terephthalate, ethylene-vinyl acetate copolymer, ethylene propylene terpolymer, thermoplastic polyurethane elastomer rubber, thermoplastic elastomer material, organosilicon gel, liquid silicone rubber, or any combination thereof. The allochroic powder may be a photic powder, a thermochromic powder, or a combination thereof. Borax solution and/or boric acid solution, which may be added to various embodiments of this invention, acts as a cross-linking agent for cross-linking reaction with the glue to change the present invention from a liquid into a multi-color gelatinous slime with allochroic and noctilucent properties.

An exemplary generic method for making the multifunctional aqueous allochroic (color-changing) noctilucent (glow-in-the-dark) glues of the present invention includes the following steps. First, shape a mixture of long-afterglow phosphor powder and transparent resin by injection molding or extrusion to obtain a particulate noctilucent suspension through crushing. Alternately, evenly spread the mixture of long-afterglow phosphor powder and transparent resin on the surface of sheet material to obtain the tabular noctilucent suspension through crushing. Additionally, immerse the noctilucent suspension into a mixture of allochroic powder and transparent resin to coat the external surfaces of the noctilucent suspension particles. Second, transfer deionized water into a reaction jar (or similar vessel); maintain the temperature of reaction jar at 10° C.-20° C., and add a suspension concentrate for continuous high-speed cutting and dispersion at the rate of 600 r/min-1000 r/min to obtain a highly suspended energy system in a gel state. Third, add an adhesive (glue) at a temperature of 10° C.-30° C. for even mixing, and then increase the temperature to 80° C.-90° C. for agitation at the rate of 70 r/min-80 r/min to form a uniform and stable colloidal suspension. Under the action of he suspension concentrate, the glue is changed from linear polymeric structure into solid reticular structure to provide the system with a large superficial area, high adsorption power and strong suspension dynamics. After the described system has been created, reduce and maintain the temperature at 30° C.-50° C., add the noctilucent suspension, and then add, as desired, moisturizer, disinfectant, flash powder and/or any other desired ingredients (including Borax, in some instances) in proper proportion to one another for even mixing at the rate of 50 r/min-60 r/min. Finally, add water soluble pigments as per demand for different color for adequate mixing, and then reduce the temperature to 20° C.-30° C. for split charging.

With reference to FIG. 1, a first specific embodiment of the present invention provides an aqueous noctilucent (glow-in-the dark) liquid glue that includes the following ingredients and/or components: (i) deionized water having a mass percent in the range of 65%-85%; (ii) noctilucent suspension (which includes long-afterglow phosphor powder) having a mass percent in the range of 1%-5%; (iii) adhesive (or glue) having a mass percent in the range of 15%-20%; (iv) moisturizer having a mass percent in the range of 2%-5%; (v) suspension concentrate having a mass percent in the range of 0.6%-1.2%; (vi) disinfectant having a mass percent in the range of 0.2%-0.3%; (vii) pigment having a mass percent in the range of 0.4%-0.8%; (viii) defoamer having a mass percent in the range of 0.1%-0.2%; (ix) dispersant having mass percent in the range of 0.4%-0.5%; and (x) plasticizer having a mass percent of 0.1%. In this embodiment, the adhesive or glue component includes polyvinyl alcohol (PVA); the moisturizer includes polyethylene glycol; the suspension concentrate includes xanthan gum; and the plasticizer includes benzoic acid 990 of medium and high solubility.

An exemplary method for making the aqueous noctilucent (glow-in-the dark) liquid glue described in the preceding paragraph, wherein the glue may also include allochroic (color-changing properties), includes the following steps. First, mix the long-afterglow phosphor powder (having a mass percent of 15%) with poly (methyl methacrylate) (PMMA) resin having a mass percent of 85% for shaping and crushing to obtain noctilucent suspension particles having diameters of up to about 3 mm. Second, pour the deionized water into a reaction jar (or other appropriate vessel); maintain the temperature of the reaction jar at 10° C.-20° C.; and add the suspension concentrate for continuous high-speed cutting and dispersion at a rate of 600 r/min-1000 r/min to obtain a highly suspended energy system in a gel state. Third, add the adhesive (glue) at a temperature of 10° C.-30° C. for even mixing, and then increase the temperature to 80° C.0-90° C. for agitation at the rate of 70 r/min-80 r/min to form a uniform and stable colloidal suspension. Due to the action of the suspension concentrate, the glue is changed from a linear polymeric structure into a solid reticular structure thereby creating within the system a large superficial area, high adsorption power, and strong suspension dynamics. Once the described system has been created or otherwise formed, reduce and maintain the temperature at 30° C.-50° C., add the noctilucent suspension, and then add, as desired, moisturizer, disinfectant, allochroic powder, flash powder, and/or any other desired ingredients in proper proportion to one another for even mixing at a rate of 50 r/min60 r/min. Finally, add water soluble pigments as desired for obtaining different colors for adequate mixing, and then reduce the temperature to 20° C.-30° C. for split charging.

Figure 2:
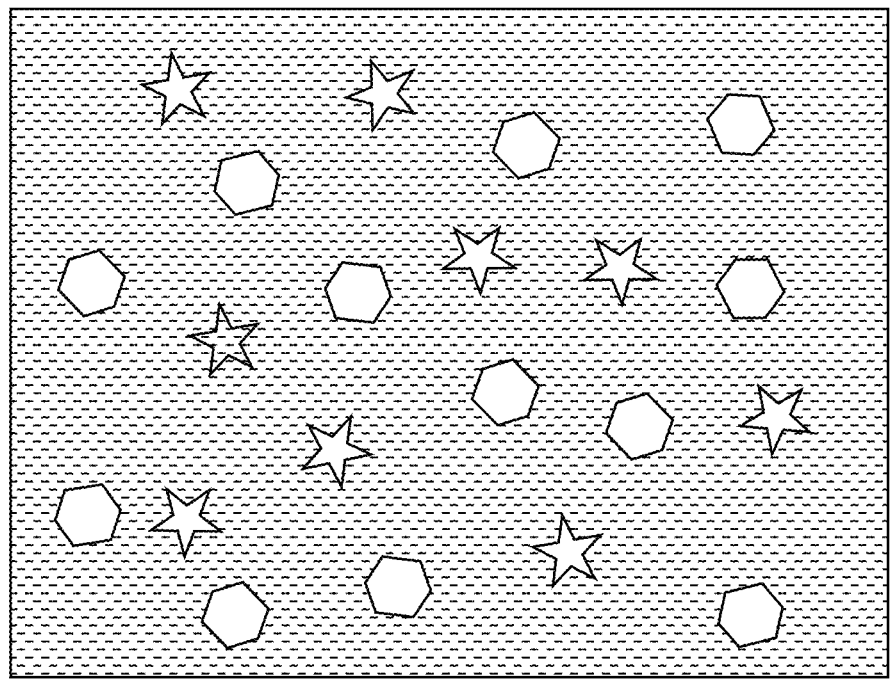
FIG. 2 is a graphic representation of a noctilucent suspension in accordance with a second exemplary embodiment of the present invention.

With reference to FIG. 2, a second specific embodiment of the present invention provides an aqueous noctilucent (glow-in-the dark) liquid glue that includes the following ingredients and/or components: (i) deionized water having a mass percent of 71.6%; (ii) noctilucent allochroic suspension sheet having a mass percent of 8%; (iii) adhesive (glue) having a mass percent of 15%; (iv) moisturizer having a mass percent of 3%; (v) suspension concentrate having a mass percent of 1%; (vi) disinfectant having a mass percent is 0.2%; (vii) pigment having a mass percent of 0.6%; defoamer having a mass percent of 0.1%; (viii) dispersant having a mass percent of 0.4%; and (ix) plasticizer having a mass percent of 0.1%. In this embodiment, the adhesive or glue component includes polyvinyl alcohol (PVA); the moisturizer includes polyethylene glycol; the suspension concentrate includes xanthan gum; and the plasticizer includes benzoic acid 990 of medium and high solubility.

An exemplary method for making the aqueous noctilucent (glow-in-the dark) liquid glue described in the preceding paragraph, wherein the glue may also include allochroic (color-changing properties), includes the following steps. First, mix the long-afterglow phosphor powder (having a mass percent of 18%) with polyethylene terephthalate (PET) resin having a mass percent of 82% and evenly coat it on the sheet surface. Proceed with carving to obtain a pentagonal and regularly hexagonal noctilucent suspension sheet (see FIG. 2) and once completed, immerse the noctilucent suspension sheet into a mixture of photochromic powder (having a mass percent of 8%) and PET transparent resin (having a mass percent of 82%) to obtain the noctilucent allochroic suspension sheet shown in FIG. 2. Second, pour the deionized water into a reaction jar (or other suitable vessel), maintain the temperature of reaction jar at 10° C.-20° C., and add the suspension concentrate for continuous high-speed cutting and dispersion at a rate of 600 r/min-1000 r/min to obtain a highly suspended energy system in a gel state. Third, add the adhesive (glue) at a temperature of 10° C.-30° C. for even mixing, and then increase the temperature to 80° C.-90° C. for agitation at the rate of 70 r/min-80 r/min to form a uniform and stable colloidal suspension. Due to the action of the suspension concentrate, the glue is changed from a linear polymeric structure into a solid reticular thereby creating within the system a large superficial area, high adsorption power, and strong suspension dynamics. Once the described system has been created or otherwise formed, reduce and maintain the temperature at 30° C.-50° C., add the noctilucent allochroic suspension sheet, and then add, as desired, moisturizer, disinfectant, allochroic powder, flash powder, and/or any other desired ingredients in proper proportion to one another for even mixing at the rate of 50 r/min-60 r/min. Finally, add water soluble pigments as desired to obtain different colors for adequate mixing, and then reduce the temperature to 20° C.-30° C. for split charging.

A third specific embodiment of the present invention provides an aqueous noctilucent (glow-in-the dark) allochroic (color-changing) hydrogel that includes the following ingredients and/or components: (i) deionized water having a mass percent of 67.6%; (ii) noctilucent allochroic suspension particles having a mass percent of 12.5%; (iii) adhesive (glue) having a mass percent of 20%; (iv) moisturizer having a mass percent of 5%; (v) suspension concentrate having a mass percent of 1%; (vi) disinfectant having a mass percent of 0.3%; (vii) pigment having a mass percent of 0.8%; (viii) defoamer having a mass percent of 0.2%; (ix) dispersant having a mass percent of 0.5%; (x) plasticizer having a mass percent of 0.1%; and (xi) Borax having a mass percent of 0.5%. In this embodiment, the adhesive or glue component includes polyvinyl alcohol (PVA); the moisturizer includes polyethylene glycol; the suspension concentrate includes xanthan gum; and the plasticizer includes benzoic acid 990 of medium and high solubility.

A method for preparing the aqueous noctilucent (glow-in-the dark) allochroic (color-changing) hydrogel described in the previous paragraph includes the following steps. First, mix the long-afterglow phosphor powder (having a mass percent of 15%) with PMMA resin (having a mass percent of 85%) for injection molding, shaping and crushing to obtain noctilucent suspension particles having diameters of up to about 3 mm. Immerse the noctilucent suspension particles in a mixture of photochromic powder (having a mass percent of 5%) and PMMA (having a mass percent of 95%) for coating to obtain the noctilucent allochroic suspension particles. Second, pour the deionized water into the reaction jar (or other suitable vessel), maintain the temperature of reaction jar at 10° C.-20° C., and add the suspension concentrate for continuous high-speed cutting and dispersion at the rate of 600 r/min-1000 r/min to obtain highly suspended energy system in gel state. Third, add the adhesive (glue) at a temperature of 10° C.-30° C. for even mixing, and then increase the temperature to 80° C.-90° C. for agitation at a rate of 70 r/min-80 r/min to form a uniform and stable colloidal suspension. Due to the action of the suspension concentrate, the glue is changed from a linear polymeric structure into a solid reticular structure, thereby creating within the system a large superficial area, high adsorption power, and strong suspension dynamics. Once the described system has been created or otherwise formed, reduce and maintain the temperature at 30° C.-50° C., add noctilucent suspension particles, and then add, as desired, moisturizer, disinfectant, and/or any other desired ingredients in proper proportion to one another for even mixing at the rate of 50 r/min-60 r/min. Finally, add Borax and water-soluble pigments as desired to obtain different colors for adequate mixing, and then reduce the temperature to 20° C.-30° C. for split charging.

While the present invention has been illustrated by the description of exemplary embodiments thereof, and while the embodiments have been described in certain detail, there is no intention to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described.

Accordingly, departures may be made from such details without departing from the spirit or scope of the general inventive concept.

What is claimed is:
1. An aqueous glue, comprising:
  (a) deionized water, wherein the mass percent of the deionized water is in the range of 65%-85%;
  (b) noctilucent material, wherein the mass percent of the noctilucent material is in the range of 1%-25%, and wherein the noctilucent material includes:
    (i) long-afterglow phosphor powder, wherein the long-after glow phosphor powder is 1%-70% of the noctilucent material; and
    (ii) a transparent medium, wherein the transparent medium is 30%-99% of the noctilucent material;
    (iii) wherein the noctilucent material includes particles formed by creating, curing, and then crushing a suspension, mixture, or sheet of the long-afterglow phosphor powder and transparent medium, and
    (iv) wherein the particles have been coated with a layer of allochroic material;
  (c) adhesive, wherein the mass percent of the adhesive is in the range of 15%-20%; and
  (d) suspension concentrate, wherein the mass percent of the suspension concentrate is in the range of 0.6%-1.2%.
2. The aqueous glue of claim 1, further comprising:
  (a) moisturizer, wherein the mass percent of the moisturizer is in the range of 2%-5%;
  (b) disinfectant, wherein the mass percent of the disinfectant is in the range of 0.2%-0.3%;
  (c) pigment, wherein the mass percent of the pigment is in the range of 0.4%-0.8%;
  (d) defoamer, wherein the mass percent of the defoamer is in the range of 0.1%-0.2%;
  (e) dispersant, wherein the mass percent of the dispersant is in the range of 0.4%-0.5%;
  (f) plasticizer, wherein the mass percent of the plasticizer is in the range of 0.1%; and
  (g) flash powder, wherein the mass percent of the flash powder is in the range of 0-10%.
3. The aqueous glue of claim 2, further comprising sodium tetraborate, wherein the mass percent of the sodium tetraborate is in the range of 0-0.6%.
4. The aqueous glue of claim 3, wherein the sodium tetraborate is in the form of a gel formed through a cross linking reaction with the adhesive.
5. The aqueous glue of claim 1, wherein the allochroic material has been coated onto the sheet of noctilucent material prior to the sheet being crushed to form the particles.
6. The aqueous glue of claim 1, wherein the allochroic material includes:
  (a) allochroic powder, wherein the allochroic powder is 10%-30% of the allochroic material; and
  (b) a transparent medium, wherein the transparent medium is 70%-90% of the allochroic material.
7. The aqueous glue of claim 6, wherein the allochroic powder is photic powder, a thermochromic powder, or a combination thereof.
8. The aqueous glue of claim 1, wherein the transparent medium includes polyethylene, polypropylene, polymethyl methacrylate, polycarbonate, polyvinyl chloride, polyamide, polyethylene terephthalate, ethylene-vinyl acetate copolymer, ethylene propylene terpolymer, thermoplastic polyure- thane elastomer rubber, thermoplastic elastomer material, organosilicon gel, liquid silicone rubber, or combinations thereof.

9. The aqueous glue of claim 1, wherein the adhesive includes polyvinyl alcohol, polyvinyl acetate emulsion, polyvinylpyrrolidone, acrylic emulsion, or combinations thereof.

10. The aqueous glue of claim 2,
(a) wherein the moisturizer includes polyethylene glycol, propylene glycol, glycerol, sorbitol, or combinations thereof;
(b) wherein the suspension concentrate includes xanthan gum, carbo resin, guar gum, sodium carboxymethyl cellulose or combinations thereof; and
(c) wherein the plasticizer includes sodium benzoate 990 or 998 of medium and high solubility.

* * * * *